United States Patent [19]
Feichtinger

[11] Patent Number: 5,929,129
[45] Date of Patent: Jul. 27, 1999

[54] CROSSLINKED FOAMABLE COMPOSITIONS OF SILANE-GRAFTED, ESSENTIALLY LINEAR POLYOLEFINS BLENDED WITH POLYPROPYLENE

[75] Inventor: Kurt Feichtinger, Saratoga Springs, N.Y.

[73] Assignee: Sentinel Products Corp., Hyannis, Mass.

[21] Appl. No.: 08/678,953

[22] Filed: Jul. 12, 1996

Related U.S. Application Data

[63] Continuation-in-part of application No. 08/308,801, Sep. 19, 1994, abandoned.

[51] Int. Cl.[6] .......................................................... C08J 9/00
[52] U.S. Cl. .............................. 521/134; 521/79; 521/81; 521/142; 521/143
[58] Field of Search ................................ 521/134, 79, 81, 521/142, 143

[56] References Cited

U.S. PATENT DOCUMENTS

| | | |
|---|---|---|
| 2,254,203 | 9/1941 | Bender . |
| 2,387,730 | 10/1945 | Alderson . |
| 2,450,436 | 10/1948 | McIntire . |
| 2,515,250 | 7/1950 | McIntire . |
| 2,740,157 | 4/1956 | McCurdy et al. . |
| 2,988,777 | 6/1961 | Bieber et al. . |
| 3,067,147 | 12/1962 | Rubens et al. . |
| 3,098,831 | 7/1963 | Carr . |
| 3,098,832 | 7/1963 | Pooley et al. . |
| 3,238,565 | 3/1966 | Jacobs . |
| 3,287,477 | 11/1966 | Vesilind . |
| 3,335,892 | 8/1967 | Hildreth . |
| 3,338,864 | 8/1967 | Megall et al. . |
| 3,379,802 | 4/1968 | Raley . |
| 3,396,062 | 8/1968 | White . |
| 3,399,098 | 8/1968 | Omoto et al. . |
| 3,413,387 | 11/1968 | Ohsol . |
| 3,413,388 | 11/1968 | Lux et al. . |
| 3,431,163 | 3/1969 | Gilbert . |
| 3,431,164 | 3/1969 | Gilbert . |
| 3,539,473 | 11/1970 | Simpson et al. . |
| 3,565,243 | 2/1971 | Freeman . |
| 3,639,304 | 2/1972 | Raley, Jr. . |
| 3,644,230 | 2/1972 | Cronin . |
| 3,645,155 | 2/1972 | Robinson . |
| 3,645,992 | 2/1972 | Elston . |
| 3,646,155 | 2/1972 | Scott . |
| 3,651,183 | 3/1972 | Hosoda et al. . |
| 3,711,584 | 1/1973 | Sagane et al. . |
| 3,743,611 | 7/1973 | Muroi et al. . |
| 3,755,208 | 8/1973 | Ehrenfreund . |
| 3,804,684 | 4/1974 | Tokushige et al. . |
| 3,808,300 | 4/1974 | Miyamoto et al. . |
| 3,814,779 | 6/1974 | Wiley . |
| 3,886,100 | 5/1975 | Yasuda et al. . |
| 3,936,518 | 2/1976 | Soda et al. . |
| 3,938,661 | 2/1976 | Carmody . |
| 3,949,028 | 4/1976 | Murakami et al. . |
| 3,953,558 | 4/1976 | Hatano et al. . |
| 3,954,929 | 5/1976 | Hoenke . |
| 3,959,189 | 5/1976 | Kitamori . |
| 3,960,784 | 6/1976 | Rubens . |
| 3,965,054 | 6/1976 | Nojiri et al. . |
| 3,966,381 | 6/1976 | Suh . |
| 3,976,530 | 8/1976 | Callan . |
| 3,996,171 | 12/1976 | Holland et al. . |
| 4,048,275 | 9/1977 | Usamoto et al. . |
| 4,053,341 | 10/1977 | Kleiner et al. . |
| 4,058,583 | 11/1977 | Glander et al. . |
| 4,076,698 | 2/1978 | Anderson et al. . |
| 4,080,344 | 3/1978 | Ikeda et al. . |
| 4,089,818 | 5/1978 | Slocumb . |
| 4,102,720 | 7/1978 | Kaneko et al. . |
| 4,102,829 | 7/1978 | Watanabe et al. . |
| 4,110,269 | 8/1978 | Ehrenfruend . |
| 4,117,195 | 9/1978 | Swarbrick et al. . |
| 4,126,598 | 11/1978 | Reighter . |
| 4,142,956 | 3/1979 | Shikinami et al. . |
| 4,146,598 | 3/1979 | Coyne . |
| 4,163,085 | 7/1979 | Kuhnel et al. . |
| 4,168,353 | 9/1979 | Kitamori . |

(List continued on next page.)

FOREIGN PATENT DOCUMENTS

| | | |
|---|---|---|
| 451864 | 10/1948 | Canada . |
| 0 584 927 A2 | 3/1994 | European Pat. Off. . |
| 0 702 032 A2 | 3/1996 | European Pat. Off. . |
| WO 90/03414 | 4/1990 | WIPO . |
| WO 92/14784 | 9/1992 | WIPO . |
| WO 93/03093 | 2/1993 | WIPO . |

OTHER PUBLICATIONS

Borg, "Ethylene/Propylene Rubber" *Rubber Technology*, Van Nostrand Reinhold Company, pp. 220–248, 1973.

Mukherjee et al., "Radiation–Induced Changes in Polyolefins" Rev. Macromol. Chem. Phys., C26(3):415–436 1986.

Park, "Handbook of Polymeric Foams and Foam Technology, Polyolefin Foam," Oxford University Press, Chapter 9, pp. 156–242.

Ultsch & Fritz, "Crosslinking of LLDPE and VLDPE via graft–polymerized vinyltrimethoxysilane" *Rubber Processing and Applications*, 13:81–91, 1990.

*Primary Examiner*—Morton Foelak
*Attorney, Agent, or Firm*—Fish & Richardson P.C.

[57] ABSTRACT

New cross-linked polymeric foam compositions, and methods for making the same, are provided. The new compositions utilize novel cross-linked polyolefin copolymers and show improvements in strength, toughness, flexibility, heat resistance and heat-sealing temperature ranges as compared to conventional low density polyethylene compositions. The new compositions also show processing improvements over linear low density polyethylene. The novel polyolefins, which are essentially linear, comprise ethylene polymerized with at least one alpha-unsaturated C3 to C20 olefinic comonomer, and optionally at least one C3 to C20 polyene, and exhibit, in an uncross-linked sense, a resin density in the range of about 0.86 g/cm3 to about 0.96 g/cm3, a melt index in the range of about 0.5 dg/min to about 100 dg/min, a molecular weight distribution in the range of from about 1.5 to about 3.5, and a composition distribution breadth index greater than about 45 percent.

25 Claims, No Drawings

U.S. PATENT DOCUMENTS

| | | |
|---|---|---|
| 4,181,647 | 1/1980 | Beach . |
| 4,181,762 | 1/1980 | Benedyk . |
| 4,182,398 | 1/1980 | Salyer et al. . |
| 4,203,815 | 5/1980 | Noda et al. . |
| 4,209,473 | 6/1980 | Coyne . |
| 4,211,590 | 7/1980 | Steward et al. . |
| 4,215,202 | 7/1980 | Park . |
| 4,225,650 | 9/1980 | van Brederode et al. . |
| 4,226,946 | 10/1980 | Park et al. . |
| 4,228,255 | 10/1980 | Fuijmoto et al. . |
| 4,234,531 | 11/1980 | Jocteur . |
| 4,241,832 | 12/1980 | Bliss . |
| 4,247,651 | 1/1981 | Ohno et al. . |
| 4,275,023 | 6/1981 | Shimizu et al. . |
| 4,303,756 | 12/1981 | Kajimura et al. . |
| 4,303,757 | 12/1981 | Kajimura et al. . |
| 4,308,352 | 12/1981 | Knaus . |
| 4,333,898 | 6/1982 | Schmidtchen . |
| 4,337,321 | 6/1982 | Allada . |
| 4,347,329 | 8/1982 | Park . |
| 4,370,378 | 1/1983 | Zabrocki et al. . |
| 4,379,859 | 4/1983 | Hirosawa et al. . |
| 4,389,514 | 6/1983 | Schmidle et al. . |
| 4,399,087 | 8/1983 | Akiyama et al. . |
| 4,429,059 | 1/1984 | Ozutsumi et al. . |
| 4,433,029 | 2/1984 | Senda et al. . |
| 4,440,703 | 4/1984 | Akiyama et al. . |
| 4,443,393 | 4/1984 | Akiyama et al. . |
| 4,444,948 | 4/1984 | Hochstrasser . |
| 4,446,254 | 5/1984 | Nakae et al. . |
| 4,448,901 | 5/1984 | Senda et al. . |
| 4,464,425 | 8/1984 | Voigt et al. . |
| 4,473,665 | 9/1984 | Martini-Vvedensky et al. . |
| 4,504,534 | 3/1985 | Adachi et al. . |
| 4,510,031 | 4/1985 | Matsumura et al. . |
| 4,515,907 | 5/1985 | McCullough et al. . |
| 4,526,930 | 7/1985 | Keogh . |
| 4,542,164 | 9/1985 | Nishioka et al. . |
| 4,554,293 | 11/1985 | Park . |
| 4,581,383 | 4/1986 | Park . |
| 4,591,606 | 5/1986 | Bergstrom . |
| 4,592,468 | 6/1986 | Wallace . |
| 4,605,682 | 8/1986 | Park . |
| 4,633,361 | 12/1986 | Ela et al. . |
| 4,640,933 | 2/1987 | Park . |
| 4,652,588 | 3/1987 | Park . |
| 4,663,361 | 5/1987 | Park . |
| 4,666,946 | 5/1987 | Fudge . |
| 4,692,471 | 9/1987 | Fudge . |
| 4,694,025 | 9/1987 | Park . |
| 4,694,027 | 9/1987 | Park . |
| 4,702,868 | 10/1987 | Pontiff et al. . |
| 4,709,817 | 12/1987 | Keady et al. . |
| 4,714,716 | 12/1987 | Park . |
| 4,725,492 | 2/1988 | Yazaki et al. . |
| 4,739,547 | 4/1988 | Tanaka et al. . |
| 4,759,992 | 7/1988 | Tomko et al. . |
| 4,762,860 | 8/1988 | Park . |
| 4,767,814 | 8/1988 | Bae et al. . |
| 4,791,143 | 12/1988 | Tanaka et al. . |
| 4,791,147 | 12/1988 | Tanaka et al. . |
| 4,818,789 | 4/1989 | Tomko et al. . |
| 4,824,059 | 4/1989 | Butler . |
| 4,837,272 | 6/1989 | Kelley . |
| 4,850,913 | 7/1989 | Szabad, Jr. . |
| 4,868,044 | 9/1989 | Tanaka et al. . |
| 4,870,111 | 9/1989 | Donuiff et al. . |
| 4,873,042 | 10/1989 | Topcik . |
| 4,900,490 | 2/1990 | Kozma . |
| 4,908,166 | 3/1990 | Salyer . |
| 4,918,111 | 4/1990 | Tanaka et al. . |
| 4,937,284 | 6/1990 | Bergstrom . |
| 4,937,299 | 6/1990 | Ewen et al. . |
| 4,940,632 | 7/1990 | Nicola et al. . |
| 4,958,770 | 9/1990 | Mitchell . |
| 4,960,830 | 10/1990 | Hazelton et al. . |
| 5,026,736 | 6/1991 | Pontiff . |
| 5,047,476 | 9/1991 | Keogh . |
| 5,053,446 | 10/1991 | Salyer . |
| 5,064,802 | 11/1991 | Stevens et al. . |
| 5,064,903 | 11/1991 | Peiffer . |
| 5,086,121 | 2/1992 | Hazelton et al. . |
| 5,093,206 | 3/1992 | Schoenbeck . |
| 5,112,919 | 5/1992 | Furrer et al. . |
| 5,132,380 | 7/1992 | Stevens et al. . |
| 5,151,204 | 9/1992 | Struglinski . |
| 5,186,851 | 2/1993 | Gutierrez et al. . |
| 5,206,075 | 4/1993 | Hodgson, Jr. . |
| 5,210,150 | 5/1993 | Prejean . |
| 5,246,783 | 9/1993 | Spenadel et al. . |
| 5,268,115 | 12/1993 | Gutierrez et al. . |
| 5,272,236 | 12/1993 | Lai et al. . |
| 5,275,747 | 1/1994 | Gutierrez et al. . |
| 5,277,833 | 1/1994 | Song et al. . |
| 5,278,264 | 1/1994 | Spaleck et al. . |
| 5,278,272 | 1/1994 | Lai et al. . |
| 5,288,762 | 2/1994 | Park et al. . |
| 5,304,580 | 4/1994 | Shibayama et al. . |
| 5,322,728 | 6/1994 | Davey et al. . |
| 5,329,033 | 7/1994 | Spaleck et al. . |
| 5,340,840 | 8/1994 | Park et al. . |
| 5,345,002 | 9/1994 | Song et al. . |
| 5,350,817 | 9/1994 | Winter et al. . |
| 5,366,647 | 11/1994 | Gutierrez et al. . |
| 5,369,136 | 11/1994 | Park et al. . |
| 5,370,229 | 12/1994 | Kroeckel et al. . |
| 5,376,428 | 12/1994 | Palazzoto et al. . |
| 5,380,810 | 1/1995 | Lai et al. . |
| 5,382,698 | 1/1995 | Song et al. . |
| 5,385,972 | 1/1995 | Yamamoto et al. . |
| 5,387,620 | 2/1995 | Park et al. . |
| 5,391,629 | 2/1995 | Turner et al. . |
| 5,407,965 | 4/1995 | Park et al. . |
| 5,408,004 | 4/1995 | Lai et al. . |
| 5,461,110 | 10/1995 | Arthurs et al. . |
| 5,589,519 | 12/1996 | Knaus . |
| 5,604,033 | 2/1997 | Arthurs et al. . |
| 5,604,288 | 2/1997 | Furukawa et al. . |
| 5,612,510 | 3/1997 | Hildreth . |

CROSSLINKED FOAMABLE COMPOSITIONS OF SILANE-GRAFTED, ESSENTIALLY LINEAR POLYOLEFINS BLENDED WITH POLYPROPYLENE

This is a continuation-in-part of U.S. Ser. No. 08/308,801, filed Sep. 19, 1994, now abandoned.

FIELD OF THE INVENTION

This invention relates generally to the art of crosslinked polyolefins, and in particular to new cross-linked foam compositions made from blends of polyolefins and polypropylene.

BACKGROUND OF THE INVENTION

Early attempts to produce physically blown foam compositions and articles from polypropylene resins melt-blended with a volatile expanding agent met with only limited success. This was due in part to the relatively low melt strength of polypropylene, which resulted in foam collapse and unacceptably high densities in the resulting products. Another factor that proved problematic with early foams was the rapid crystallization of the expanding composition, which limited the extent of expansion, and thus the thickness and minimum density, of extruded foamable compositions.

Attempts to increase the melt strength and reduce the rate of crystallization of polypropylene were successfully commercialized in a series of resins from Himont U.S.A. (now Montell U.S.A.). These resins (described as HMS or High Melt Strength resins) are readily expanded into physically blown foams.

The rigid and brittle (particularly at low temperatures) nature of polypropylene homopolymer and copolymers is a problem encountered in both foamed and unfoamed polypropylene applications. One common solution to this problem is to blend polypropylene with other resins that possess much lower bulk moduli.

Polymeric compatibility is the primary factor considered in selecting a resin for softening a crystalline thermoplastic such as polypropylene. Since the resins will necessarily be melt-blended, the various polymers must be melt-compatible, which generally requires that their individual solubility parameters be closely matched. Not only must the various polymers be mutually compatible, but the solubility of the expansion agent must be similar in each, otherwise they may segregate based upon differential solubility. Upon cooling, the polymers may not remain compatible, in which case phase-separation may occur.

Phase-separation is exploited in order to impact-modify polymeric materials, such as in the case of Acrylonitrile/Butadiene/Styrene copolymers, wherein a separate rubber phase forms during the cooling of the material, thus creating micro-domains which arrest the propagation of a fracture front. However, such phase-separating systems are rarely found in physically-expanded cellular plastics, due to the reduction of physical properties.

Known methods for reducing the modulus and/or enhancing the impact strength of polypropylene resins include the incorporation into the resin of block styrene/butadiene copolymers, such as Shell's KRATON™ resins, or poly(1-butene) homopolymer offered by Shell under the name DURAFLEX™. Linear low-density polyethylenes are known to be at least partially compatible with polypropylene.

Most recently, with the advent of new polyolefin catalyst technology, Exxon has publically, in brochures ("EXACT Plastomers—Targeted Performance for Extrusion, Molding and Polymer Modification," Brochure #119-0594-0051-A, dated May, 1994), suggested the use of their EXACT™ metallocene-catalyzed linear low-density polyethylenes to improve the toughness and reduce the modulus of polypropylene homopolymer, random copolymer and impact copolymer (high-density and high-pressure low density polyethylenes are known to be incompatible with polypropylene). Absent was mention of possible uses where the blended mixtures are physically-expanded (i.e., foam applications).

During the development of the present invention, extensive evaluations were made of EXACT™ metallocene-catalyzed polyethylenes blended into Himont's homopolymer polypropylene (Himont #PF-814, 3.0 Melt Index, 0.900 g/cc.) on a laboratory foam extruder, using isobutane as a blowing agent. Not unexpectedly, as the level of EXACT™ metallocene-catalyzed polyethylene was increased, the screw torque as evidenced by the motor draw (amperage) increased considerably. In addition, the minimum density obtained was greater, and the maximum thickness was less, than homopolymer HMS.

Since metallocene-catalyzed polyethylenes are linear low density polyethylenes by design and do not shear thin like high-pressure low density polyethylenes, they possess greater melt or apparent viscosity. Higher melt viscosity leads to the detriment of processability for physically-blown foams due to shear heating. Since shear stresses are dissipated as heat, a higher apparent melt-viscosity brings about a greater rise in temperature in the resin/blowing agent blend during melt processing, such as in an extruder. Consequently, materials which do not shear-thin as LDPE result in a greater cooling demand and limited output.

Furthermore, metallocene-catalyzedpolyethylenes lack adequate melt strength to substantially expand bi-axially without collapsing so as to form closed-cell structures. Melt strength is an attribute which is best observed by measurement of extensional viscosity, and physically-blown foams are best served by materials which shear thin extentionally. Such materials exhibit a rather high apparent viscosity at low shear rates (such as during cell formation, so the cells do not collapse) but low viscosity at high shear rates (such as those typically encountered in an extruder between the barrel and the screw, so as to limit shear heating).

In light of the above mentioned shortcomings of metallocene catalyzed polyolefins, these resins were not thought to be good candidates for producing quality foamed materials, either alone or in blends with other polymers. Surprisingly, however, it has been found that excellent foams can be made by blending silane-grafted metallocene catalyzed polyethylene resins with polypropylene. The cross-linkable physically blown foams produced from such blends have numerous properties not shared by foams produced from the ungrafted blends.

One of the most notable properties achieved by the new blends is a greater propensity to shear thin. Despite the fact that the melt index of the preferred grafted EXACT™ resin of this invention is considerably less than either of the same EXACT™ resin in ungrafted form or the preferred Himont HMS, lower motor current was observed when comparing HMS polypropylene blends of grafted EXACT™ to the same ungrafted EXACT™. A lower melt index (indicative of higher apparent viscosity at the rather low shear rates employed in the melt index test) coupled with lower motor amperage (indicative of lower apparent viscosity at the high shear rates employed in the extruder) suggests that the new grafted metallocene polyethylene blends have a greater tendency to shear-thin as compared to the non-grafted blends. Along with this enhancement in capability to shear thin came a lower density and thicker gauge, as the attached experimental results demonstrate. Other advantages were an improvement in toughness, strength and a reduction in modulus (lower compression-deflection stress), as well as the higher temperature stability inherent to polypropylene-containing blends.

In order to better highlight the differences between the present invention and the prior art, a detailed discussion of the closest related prior art follows.

Polyolefin/polypropylene blends, including polyethylene/polypropylene blends in general and LLDPE/PP blends in particular, have been generally proposed as possible choices for resins used in foam extrusion and other applications. The silane grafting of such blends has also been suggested.

Thus, U.S. Pat. No. 4,714,716 (Park) discloses a process for the production of a low density foam material having a substantially closed cell structure. Possible polymers suggested for making the material include linear olefinic polymers such as LLDPE, polypropylene, and blends thereof. Pursuant to the method, the polymeric materials are mixed with a blowing agent, which may be a volatile liquid or a solid that decomposes into gaseous materials at the extrusion temperature. A crosslinking agent, which may be a vinyl functional silane, is added to the olefinic polymer gel with the blowing agent, and serves to lightly crosslink the linear olefinic polymer with itself.

Similarly, U.S. Pat. No. 5,026,736 (Pontiff) and U.S. Pat. No. 4,702,868 (Pontiff et al.) disclose moldable polymer foam beads which are made from silane-modified polyolefins. The silane-modified polyolefin may be polyethylene, including linear low density polyethylene. The reference suggests that the polyethylene may possibly be blended with polypropylene and other compatible polymers. The blends are at least 50% by weight, and preferably 60% by weight, of the ethylene homopolymer or copolymer with the other compatible polymer. The polyolefins may be silane-grafted with vinyl trimethoxysilane and similar agents, and may be crosslinked by exposure to moisture or radiation sources.

U.S. Pat. No. 4,870,111 (Donuiff et al.) discloses the production of moldable silane-crosslinked polyolefin foam beads. The beads are produced by mixing a silane grafted polyolefin with a silanol condensation catalyst in an extruder to form a melt. A blowing agent is then injected into the melt at a rate sufficient to produce a desired foam density in the extrudate. The beads are extruded and cut, and are then exposed to moisture to induce silane crosslinking in the polyolefin foam. The polyolefin may be low density polyethylene or linear low density polyethylene. The polyethylene may be blended with up to 50% by weight of another polymer that is compatible with it. The reference suggests polypropylene as one such polymer.

U.S. Pat. No. 4,591,606 (Bergstrom) discloses a silane crosslinked polyolefin foam and a method for making the same. The foam contains a polyolefin, a chemically bound hydrolysed silane, a condensation catalyst, and a foaming agent containing water and a water carrying substance. The reference notes that possible polyolefins used in the invention include LLDPE, polypropylene, and their mixtures.

U.S. Pat. No. 5,053,446 (Salyer) discloses a composition useful in thermal energy storage. The composition may be formed from a crosslinked polyolefin having a phase change material, such as a crystalline alkyl hydrocarbon, incorporated therein. The polyolefin may be low density polyethylene or polypropylene.

U.S. Pat. No. 4,554,293 (Park) and U.S. Pat. No. 4,581,383 (Park) disclose an expandable blend of a linear olefinic polymer and a crosslinkable polymer for the production of lightly crosslinked foam compositions. The crosslinkable polymer serves to increase the melt strength of the linear olefin component, thereby allowing the use of conventional melt processing techniques for foam extrusion of the materials. The blend is about 5% to 95% by weight of a linear olefin, such as LLDPE, and from about 95% to 5% by weight of a crosslinkable polymer. The preferred crosslinking agents include organofunctional silanes. The reference notes that, without crosslinking, the foam material produced by the method is totally collapsed. Col. 7, Lines 64–65.

However, despite the general suggestions of the above noted references, the foams actually produced from polyethylene/polypropylene resins to date have been unsatisfactory. Furthermore, the advantages afforded by blends of silane-grafted LLDPE with polypropylene, particularly in foam applications, have heretofore gone unappreciated, so that these blends have not been used in practice. This is due in part to the difficulties encountered in producing satisfactory foams from the ungrafted blends and from LLDPE itself, as illustrated in the Comparative Examples set forth in the present application. As illustrated there, the ungrafted materials tend to be difficult to process, and produce unacceptably high foam densities.

A further impediment in developing foams from LLDPE/PP blends relates to the difficulties in processing LLDPE itself. These difficulties have been noted in the art. Thus, U.S. Pat. No. 5,288,762 (Park et al.) discloses a crosslinked-foam structure made from a substantially linear ethylenic polymer. The material is made by blending and heating a decomposible chemical blowing agent and an ethylenic polymer material. Crosslinking is then induced in the material, and the foamable melt material is expanded by exposing it to an elevated temperature. The resulting material is substantially linear, and has better processibility and foamability than LLDPE. The reference notes that LLDPE is difficult to process into a crosslinked foam, Col. 1, Lines 28–31, and results in a relatively high density foam structure with poor processability.

Yet another factor that has hampered the development of satisfactory LLDPE/PP foams is the high degree of unpredictability in the foam extrusion art. This is exemplified by U.S. Pat. No. 4,226,946 (Park et al.), which discloses foamed materials made from blends of low density branched polyethylene in admixture with intermediate density linear polyethylene. The reference notes that "Although a number of general principles are thought to be understood, much of the extrusion foaming technology is empirical, based on experience, and directed to very specific materials and details to produce saleable products of narrowly defined specification." Col. 1, Lines 31–36.

The use of metallocene catalysts in producing a variety of polymeric materials is known. Thus, U.S. Pat. No. 5,350,817 (Winter et al.) discloses the use of a metallocene catalysts in producing polypropylenes (see Example 1) and other polyolefins having a broad molecular weight distribution.

U.S. Pat. No. 5,278,264 (Spaleck et al.) and U.S. Pat. No. 5,329,033 (Spaleck et al.) describe the use of metallocene catalysts in making polypropylene and other polyolefins.

U.S. Pat. No. 5,186,851 (Gutierrez et al.) and U.S. Pat. No. 5,151,204 (Struglinski) describe the use of metallocene catalysts in making lubricating oil additives.

U.S. Pat. No. 5,268,115 (Gutierrez et al.), U.S. Pat. No. 5,275,747 (Gutierrez et al.), and U.S. Pat. No. 5,366,647 (Gutierrez et al.) describe the use of metallocene catalysts in making multifunctional viscosity index improver additives.

U.S. Pat. No. 5,277,833 (Song et al.), U.S. Pat. No. 5,382,698 (Song et al.), and U.S. Pat. No. 5,345,002 (Song et al.) show the use of metallocene catalysts in making dispersant additives for lubricating oils.

U.S. Pat. No. 5,391,629 (Turner et al.) discloses the use of a catalyst system having a metallocene component and an electron donor cation component in making block copolymers of ethylene and an α-olefin such as propylene. The reference notes that the block copolymers are superior to blends in that the covalent bonding between the segments eliminates interface problems, and because the block copolymers can be used as emulsifiers to strengthen blends of immiscible polymers.

U.S. Pat. No. 4,818,789 (Tomko et al.), U.S. Pat. No. 4,759,992 (Tomko et al.) and U.S. Pat. No. 4,767,814 (Bae et al.) disclose moisture curable low molecular weight polymers which have a silane grafted saturated carbon backbone. The backbone is preferably an ethylene/propylene copolymer which is prepared through the use of a metallocene catalyst.

U.S. Pat. No. 5,385,972 (Yamamoto et al.) describes a resin composition comprising an ethylene copolymer and a particulate inorganic filler. The ethylene copolymer is a copolymer of ethylene and an α-olefin, such as propylene, with a carbon number greater or equal to 3. The copolymer is formed through the use of a metallocene catalyst. The resin is used to make thin, gas permeable bodies.

U.S. Pat. No. 5,376,428 (Palazzotto et al.) describes an energy polymerizable composition containing at least one ethylenically unsaturated monomer, a polyurethane precursor, at least one epoxy monomer, a curing agent comprising an organometallic compound, and an onium salt as an oxidizing agent.

The use of silane grafting agents in grafting polyethylene and similar materials is also well known, as noted in some of the aforementioned references. Additional references include U.S. Pat. No. 4,058,583 (Glander et al.), which discloses the grafting of silane onto polyethylene. The grafting is accomplished by mixing the polymer in granulated form with a mixture of silane and peroxide. Grafting is then induced through extrusion or radiation. The grafted polymer may then be crosslinked through exposure to moisture.

U.S. Pat. No. 4,873,042 (Topcik) discloses a process for extruding a thermoplastic copolymer, whereby the copolymer is coated with an organic peroxide. Under extrusion conditions, the peroxide decomposes to provide a silanol condensation catalyst.

U.S. Pat. No. 5,047,476 (Keogh) discloses a process for crosslinking a copolymer containing a hydrolyzable silane moiety. The copolymer is mixed with dihydrocarbyltin oxide and a carboxylic acid or a carboxylate capable of forming a carboxylic acid through exposure to heat or moisture. The crosslinking is achieved by passing the mixture through a crosslinking zone where conditions are such that the carboxylic acid reacts with the dihydrocarbyltin oxide to form dihydrocarbyltin carboxylate. The crosslinking zone has a moisture content sufficient to crosslink the hydrolyzable copolymer in the presence of the dihydrocarbyltin carboxylate.

U.S. Pat. No. 4,464,425 (Voigt et al.) describes the use of a foamable, silane grafted polymer, such as polyethylene, in making shrink wrap materials.

U.S. Pat. No. 4,937,284 (Bergstrom) describes a method for manufacturing olefin/vinyl alcohol block copolymers by chemically joining polyvinyl alcohol (PVA) to a polyolefin through the agency of silane. The block copolymers obtained contain nonpolar polyolefin branches and polar polyvinyl branches.

Various blends or copolymers of polyethylene with other polymers are also known, as described above. Further examples involving non-olefinic polymers include U.S. Pat. No. 4,181,762 (Benedyk), which describes the formation of fibers from polymers having an elastic modulus of between 5,000 to 60,000 psi. The polymers are preferably copolymers of ethylene and vinyl acetate.

U.S. Pat. No. 4,725,492 (Yazaki et al.) discloses a composite heat insulating material comprising a urethane foam and a polyolefin-based resin containing carboxyl groups or a polyolefin-based resin containing hydroxyl groups.

The use of various agents to control the degree of crosslinking in foam extrusion applications is also known. Thus, U.S. Pat. No. 4,762,860 (Park) and U.S. Pat. No. 4,694,025 (Park) teach the use of alcohols to control the degree of crosslinking in a polymer prior to extrusion foaming.

SUMMARY OF THE INVENTION

The invention features new cross-linked polymeric foam compositions and methods for making the same. The new compositions use cross-linked polyolefin copolymers and show improvements in strength, toughness, flexibility, heat resistance and heat-sealing temperature ranges as compared to conventional low density polyethylene compositions. The new compositions also show processing improvements over linear low density polyethylene. The compositions include novel polyolefins, which are essentially linear, include ethylene polymerized with at least one alpha-unsaturated $C_3$ to $C_{20}$ olefinic comonomer, and optionally at least one $C_3$ to $C_{20}$ polyene, and exhibit, in an uncross-linked sense, a resin density in the range of about 0.86 g/cm$^3$ to about 0.96 g/cm$^3$, a melt index in the range of about 0.5 dg/min to about 100 dg/min, a molecular weight distribution in the range of from about 1.5 to about 3.5, and a composition distribution breadth index greater than about 45 percent.

In one aspect, the invention features a crosslinkable composition including a blend of polypropylene with silane-grafted, essentially linear polyolefin. The polyolefin can have a molecular weight distribution in the range of from about 1.5 to about 3.5, a composition distribution breadth index greater than about 45 percent, and a density within the range of about 1.2 to about 10 pcf.

In another aspect, the invention features a foamable, crosslinkable composition including a blend of substantially ungrafted homopolymer or copolymer polypropylene with silane-grafted, essentially linear, metallocene catalyzed polyolefin.

In another aspect, the invention features a crosslinked foam composition including a blend of substantially ungrafted homopolymer or copolymer polypropylene with silane-grafted, essentially linear, metallocene catalyzed polyolefin.

The polypropylene can be blended with the metallocene catalyzed polyolefin at a ratio by weight of between 99/1 and 50/50. The metallocene catalyzed polyolefin can be silane grafted with a multi-functional vinyl silane selected from the group consisting of vinyl trimethoxy silane and vinyl triethoxy silane.

In another aspect, the invention features a method for producing a foam composition. The method includes the steps of providing a foamable, crosslinkable composition comprising a blend of silane-grafted, essentially linear polyolefin with polypropylene, introducing a blowing agent into the composition, and expanding the composition into a foam.

DETAILED DESCRIPTION OF THE INVENTION

Using conventional extrusion methods, a linear low-density polyethylene, either absent of, or possessing a low level of long-chain branching (such as metallocene-catalyzed polyolefins) is grafted with a mixture of multifunctional vinyl silane (such as vinyl trimethoxy silane or vinyl triethoxy silane) and organic peroxide. Extrusion conditions are non-critical except that the choice of peroxide and temperatures should be such that the decomposition of the peroxide and the subsequent grafting reaction are accomplished within the residence time in said extruder.

In a preferred embodiment, the grafting mixture is vinyl trimethoxy silane (Huls #CV-4917) and alpha, alpha'-bis (t-butylperoxy) diisopropyl benzene (VULCUP-R) in a ratio of between 100:1 and 10:1. In a more preferred embodiment, the ratio of silane to peroxide is between 50:1 and 10:1. The most preferred ratio is 20:1.

The rate of silane/peroxide mixture is most preferably 0.4% of the resin feed rate, although others may be advantageous. The objective is to provide for a subsequently crosslinkable resin which results in a (cross-linked) gel content of between 5% and 95% by weight. The feed blend to the extruder may optionally comprise other resins, including homopolymer or copolymer polypropylene, antioxidants, ultra-violet absorbers and other additives.

The grafted resin or resin blend is then fed into any of the commonly utilized extrusion lines for the production of physically blown foams, including, but not limited to, single-screw, twin screw, single screw/single screw tandem line, and single screw/accumulator tandem lines. Other additives may optionally be employed at this point, such as nucleants, cell-control additives, other grafted or ungrafted resins, colorants, antioxidants, ultra-violet absorbers, stabilizers and the like. Shaping and forming dies and mandrels may be any of those known to the art, such as sheet-producing or plank-producing dies and forming equipment.

In a preferred embodiment, the grafted metallocene-catalyzed polyolefin (grafted EXACT resin) is blended with homopolymer polypropylene (Himont PF-814) in a ratio of between 1/99 and 50/50. In a more preferred embodiment, the ratio is between 5/95 and 40/60. The most preferred ratio is between 5/95 and 20/80. Most preferably, glycerol monostearate (GMS, Witco ATMOS-150 or Patco PATIONIC #1052) at a level of 1% by weight of fed resins is utilized to control the shrinkage of the foam, although many other cell control agents have been elucidated in the art which could be used herein. Any nucleant may be utilized, most preferably those which do not contain or liberate appreciable amounts of water. Suitable nucleants include talc (Luzenac MISTRON SUPER FROST or MISTRON ZSC), at levels from 0.25% to 2.5% by weight of combined feed.

Any suitable volatile expansion agent as is known to the art may be employed in the present invention. However, since exclusion of moisture is necessary to prevent the premature crosslinking of the silane-grafted resins, this should be a consideration in choice or purity of expansion agent. Thus, the most preferred embodiment utilizes isobutane as a blowing agent. The rate of blowing agent is a function of the desired density, and is selected accordingly.

A catalyst may also be included in the feed formulation to the foaming extruder(s) in order to effect the subsequent silanolysis cross-linking reaction. Many catalysts suitable for this purpose are known to the art. However, the most preferred catalyst is dibutyl tin dilaurate, at a level of 0.015% of combined feed weight. Cross-linking of the extruded foam product is preferably accomplished at ambient conditions. However, where greatly reduced storage times are desirable, elevated temperatures or humidities may be used.

The polyolefin resins used in this invention preferably possess a narrow molecular weight distribution and are "essentially linear," although they contain a desired level of uniformly distributed, highly controlled "short chain branching". As a result of this combination, the resins exhibit a strength and toughness approaching that of linear low density polyethylenes, but have processability similar to high pressure, reactor produced low density polyethylene. These "essentially linear" polyolefin resins are characterized by a resin density in the range of about 0.86 g/cm$^3$ to about 0.96 g/cm$^3$, a melt index in the range of about 0.5 dg/min to about 100 dg/min, a molecular weight distribution in the range of from about 1.5 to about 3.5, and a composition distribution breadth index greater than about 45 percent.

As used throughout this disclosure, the term "linear polyolefin" refers to an olefin polymer lacking "long chain branching," as exemplified by the conventionally produced linear low density polyethylene or linear high density polyethylene polymers made using Ziegler polymerization processes and disclosed, for example, in U.S. Pat. No. 4,076,698 and U.S. Pat. No. 3,645,992. The term does not refer to high pressure, reactor produced branched polyethylenes, or to copolymers of ethylene and vinyl acetate, vinyl alcohol, ethyl acrylate, methyl acrylate, acrylic acid, or the like which are made using high-pressure technology and which are known to have numerous long-chain branches.

As used throughout this disclosure, the term "essentially linear" refers to a "linear polymer" with a molecular backbone which is virtually absent of "long-chain branching," to the extent that less than about 0.01 "long-chain branches" per one-thousand carbon atoms are manifested thereof. Similarly, as used throughout this disclosure, the phrase "substantially free from long-chain branching" refers to a "linear polymer" with a molecular backbone having less than about 0.01 "long-chain branches" per one-thousand carbon atoms manifested thereof.

As used throughout this disclosure, the term "long chain branching" refers to a molecular branch of a molecular backbone of at least 6 carbon atoms, above which the length cannot be distinguished using 13C nuclear magnetic resonance (NMR) spectroscopy. The long chain branch can be as long as about the same length as the molecular backbone. Methods of quantifying long chain branching by use of 13C NMR spectroscopy were described by Randall (Rev. Macromol. Chem. Phys., C29 (2&3), p. 285–297).

As used throughout this disclosure, the term "short-chain branching" is defined as a molecular branch of a molecular backbone of less than 6 carbon atoms which, as described above, would be distinguishable by 13C NMR spectroscopic methods.

As used throughout this disclosure, the term "copolymer" refers to material resulting from the polymerization of two or more monomeric species, and specifically encompasses terpolymers (e.g., materials resulting from the polymerization of three or more monomeric species), sesquipolymers, and greater combinations of monomeric species thereof.

The densities, or specific gravities, of the resins herein disclosed were measured using ASTM D-792 methods, except that they were additionally conditioned by holding them for 48 hours at ambient temperature (23° C.) prior to the density measurements. The essentially linear polyolefin resins disclosed in this invention are generally characterized by a resin density in the range of about 0.86 g/cm3 to about 0.96 g/cm3, preferably of about 0.86 g/cm3 to about 0.91 g/cm3.

The "Melt Index" (MI) is a measurement of processability under low shear rate conditions, in accordance with ASTM D-1238 Condition E (190° C./2.16 kg). For the essentially linear polyolefins disclosed in this invention, the MI is generally in the range of about 0.2 dg/min to about 100 dg/min. Preferably, the MI is in the range of about 1 dg/min to about 10 dg/min, and most preferably in the range of about 2 dg/min to about 8 dg/min.

The molecular weight distribution (MWD or Mw/Mn) is a parameter determined by use of gel permeation chromatography with multiple mixed-porosity columns, comparing elution volumes of the unknown to those of narrow MWD polystyrene standards. The correspondence is accomplished by using the appropriate Mark-Houwink coefficients for the polystyrene standard and the polyethylene unknown, with procedures as described by Williams and Word in Journal of Polymer Science, Polymer Letters, Vol. 6, (621) 1968, incorporated herein by reference.

The Composition Distribution Breadth Index (CDBI) is a measurement of the uniformity of distribution of comonomer to the copolymer molecules, and is determined by the technique of Temperature Rising Elution Fractionation (TREF), as described in, for example, Wild et. al., J. Poly. Sci., Poly. Phys. Phys. Ed., Vol. 20, p. 441 (1982). This attribute relates to polymer crystallizability, optical properties, toughness and many other important performance characteristics of compositions of the present art. For example, a polyolefin resin of high density with a high CDBI would crystallize less readily than another with a lower CDBI but equal comonomer content and other characteristics, enhancing toughness in objects of the present invention. The benefits to the discovery of the subject invention that accrue through the specific use of essentially linear polyolefin copolymers of narrow composition distribution are elucidated later in the examples.

As used herein, the CDBI is defined as the weight percent of the copolymer molecules having a comonomer content within 50% (i.e. ±50%) of the median total molar comonomer content. Unless otherwise indicated, terms such as "comonomer content," "average comonomer content" and the like refer to the bulk comonomer content of the indicated interpolymer blend, blend component or fraction on a molar basis. For reference, the CDBI of linear poly(ethylene), which is absent of comonomer, is defined to be 100%. CDBI determination clearly distinguishes the low density polyolefins of this art, which show narrow composition distribution as assessed by CDBI values generally above 70%, from very low density polyolefin copolymers produced by conventional linear catalyst technology, which have a broad composition distribution as assessed by CDBI values generally less than 55%. The CDBI of the essentially linear polyolefin copolymers disclosed in this invention is generally about 45% or higher, preferably about 50% or higher, more preferably about 60% or higher, and most preferably about 70% or higher.

The "essentially linear" polyolefin copolymers of the present invention are preferably produced through the use of metallocene catalysts in accordance with any suitable polymerization process, including gas phase polymerization, slurry polymerization, and high pressure polymerization. However, the methods of the present invention are not restricted to the use of metallocene catalysts.

Preferably, the "essentially linear" polyolefins used in the foam compositions of the present invention are produced by gas-phase polymerization. Gas phase polymerization processes generally utilize super-atmospheric pressures and temperatures in the range of about 50° C. to about 120° C. Such polymerization can be performed in a stirred or fluidized bed of catalyst and product particles in a pressurized vessel adapted to facilitate the separation of product particles form unreacted gases therein. Maintenance of temperature may be accomplished by circulation of ethylene, comonomer, hydrogen or inert gas such as nitrogen. Triethylaluminum may be added as needed as a scavenger of water, oxygen, and other undesirable impurities. The polymer produced thereof may be withdrawn continuously or semi-continuously at a rate necessary to maintain a constant product inventory in the reactor.

The essentially linear polyolefin copolymers of the present invention may also be produced using a high pressure process by polymerizing ethylene in combination with the other desired monomers in the presence of the metallocene alumoxane catalyst system. It is critical to this method is that the polymerization temperature be above 120° C., but below the decomposition temperature of the product, and that the polymerization pressure be above about 500 kg/cm2. In certain instances wherein the molecular weight of the product must be controlled, any of the suitable techniques known in the art for control of molecular weight, such as the use of hydrogen or reactor temperature, may be employed to effect such control therein.

The essentially linear olefinic copolymers of the present invention are preferably derived from ethylene polymerized with at least one comonomer selected from the group consisting of at least one alpha-unsaturated C3 to C20 olefin comonomer, and optionally one or more C3 to C20 polyene. The types of comonomers selected to produce the essentially linear polymer utilized in the present invention will depend upon economics and the desired end-use of the resultant cross-linked foam structure.

Generally, the alpha-unsaturated olefin comonomers suitable for use in the present invention contain in the range of about 3 to about 20 carbon atoms. Preferably, the alpha-unsaturated olefins contain in the range of about 3 to about 16 carbon atoms, and most preferably in the range of about 3 to about 8 carbon atoms. Illustrative, non-limiting examples of such alpha-unsaturated olefin comonomers used as copolymers with ethylene include propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinyl cyclohexene, vinylbenzocyclobutane and the like.

Generally, the polyenes used in the present invention contain about 3 to about 20 carbon atoms. Preferably, the polyenes contain about 4 to about 20 carbon atoms, and most preferably about 4 to about 15 carbon atoms. Preferably, the polyene is a straight-chain, branched chain or cyclic hydrocarbon diene having from about 3 to about 20 carbon atoms, more preferably from about 4 to about 15 carbon atoms, and most preferably from about 6 to about 15 carbon atoms. It is also preferred that the diene is non-conjugated. Illustrative non-limiting examples of such dienes include 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene and dicyclopentadiene. Especially preferred is 1,4-hexadiene.

Preferably, the polymeric foam composition of the present invention will comprise either ethylene/alpha-unsaturated olefin copolymers or ethylene/alpha-unsaturated olefin/diene terpolymers. Most preferably, the essentially linear copolymer will be ethylene/1-butene or ethylene/1-hexene.

The comonomer content of the olefin copolymers utilized in the present invention is typically in the range of about 1 percent to about 32 percent (based on the total moles of monomer), preferably in the range of about 2 percent to about 26 percent, and most preferably in the range of about 6 percent to about 25 percent.

The preferred essentially linear olefin copolymers used in making the products of the present invention are produced commercially by Exxon Chemical Company, Baytown, Tex., under the tradename Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, 41, Exact™ 4049, Exact™ 4050, Exact™ 4051, Exact™ 5008, and Exact™ 8002. Most preferably, the essentially linear olefin copolymers are selected from the group consisting of Exact™ 3024, Exact™ 4041, Exact™ 5008. However, one skilled in the art will appreciate that other resins satisfying the requirements of an absence of long-chain branching, the range of molecular weight distributions, the range of composition distribution breadth indices, the range of resin densities, and the range of melt flow indices, are also available and may be used without departing from the scope of the invention.

While the aforementioned essentially linear olefin copolymers are most preferable as the compositions of this invention, the addition of other polymers or resins to the composition, either prior or subsequent to grafting or cross-linking, can result in certain advantages in the economic, physical and handling characteristics of the cellular articles made in accordance with this invention. Examples of the polymers and resins which may be advantageously added include low density polyethylene, high density polyethylene, linear low density polyethylene, medium density polyethylene, polypropylene, ethylene propylene rubber, ethylene propylene diene monomer terpolymer, polystyrene, polyvinyl chloride, polyamides, polacrylics, cellulosics, polyesters, and polyhalocarbons. Copolymers of ethylene with propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, methyl methacrylate, acrylic acid, and methacrylic acid may also be used. Various polymers and resins which find wide application in peroxide-cured or vulcanized rubber articles may also be added, such as polychloroprene, polybutadiene, polyisoprene, poly(isobutylene), nitrile-butadiene rubber, styrene-butadiene rubber, chlorinated polyethylene, chlorosulfonated polyethylene, epichlorohydrin rubber, polyacrylates, and butyl or halo-butyl rubbers. Other resins are also possible, as will be apparent to one skilled in the art, including blends of the above materials. Any or all of the additional polymers or resins may be advantageously grafted or cross-linked, in concert or separately, within the scope of the object of this invention.

Preferred resins, to be added to the object copolymer of this invention, include polypropylene, polystyrene, low density polyethylene, linear low density polyethylene, ethylene/ethyl acrylate, and ethylene/methyl acrylate, and combinations of two or more of these materials. The preferred level of the essentially linear polyolefin copolymer, as a percentage of total polymeric resin, preferably ranges from about 5% to about 100%, more preferably from about 10% to about 60%, and most preferably from about 10% to about 40%.

The cross-linking of the compositions useful in the practice of the present invention is preferably accomplished by the use of chemical cross-linking agents or high-energy radiation. Suitable methods of chemical cross-linking include the use of decomposable, free-radical generating species, or the use of silane-grafting, wherein the molecular backbone of the constituents of said composition are chemically reacted with a subsequently cross-linkable chemical species. In the latter case, the cross-link is appropriately effected by the use of warm, moist conditions subsequent to the grafting step, optionally with a suitable catalyst. Combinations of methods of cross-linking may be utilized to facilitate the degree of control and achieve the desired level of cross-linking.

Representative chemical cross-linking agents which are usefully employed herein include the organic peroxides, azido and vinyl functional silanes, multifunctional vinyl monomers, organo-titanates, organo-zirconates and p-quinone dioximes. The chemical cross-linking agent may be advantageously selected by reference to the processing temperature and permissible time at the desired event of said cross-linking reaction. That is to say, by selecting a chemical cross-linking agent which exhibits a half-life of between one minute and 60 minutes at the preferred temperature of the cross-linking event, the rate of cross-linking may be expeditiously induced with the required degree of control. The processing temperature and permissible time of the cross-linking event are often dictated by material handling requirements, for example proper conveyance of the composition through an extruder at reasonable rates thereof.

Suitable chemical cross-linking agents for the compositions of this invention include, but are not limited to, organic peroxides, preferably alkyl and aralkyl peroxides. Examples of such peroxides include dicumylperoxide, 2,5-dimethyl-2,5-di(t-butylperoxy)hexane, 1,1-bis(t-butylperoxy)-3,3,5-trimethylcyclohexane, 1,1-di-(t-butylperoxy)-cyclohexane, 2,2'-bis(t-butylperoxy) diisopropylbenzene, 4,4'-bis(t-butylperoxy)butylvalerate, t-butyl-perbenzoate, t-butylperterephthalate, and t-butyl peroxide. Most preferably, the cross-linking agent is dicumyl peroxide.

Chemically-crosslinked compositions are improved upon with the addition of multi-functional monomeric species, often referred to as "coagents." Illustrative, but non-limiting, examples of coagents suitable for use in chemical crosslinking in accordance with the present invention include di- and tri-allyl cyanurates and isocyanurates, alkyl di- and tri-acrylates and methacrylates, zinc-based dimethacrylates and diacrylates, and 1,2-polybutadiene resins.

Included in the cross-linking agents that may be used with the present invention are the azido-functional silanes of the general formula $RR'SiY_2$, wherein R represents an azido-functional radical attached to silicon through a silicon-to-carbon bond and composed of carbon, hydrogen, optionally sulfur and oxygen, wherein each Y represents a hydrolyzable organic radical, and wherein R' represents a monovalent hydrocarbon radical or a hydrolyzable organic radical.

Azido-silane compounds graft onto an olefinic polymer though a nitrine insertion reaction. Crosslinking develops through hydrolysis of the silanes to silanols followed by condensation of silanols to siloxanes. The condensation of silanols to siloxanes is catalyzed by certain metal soap catalysts such as dibutyl tin dilaurate or butyl tin maleate and the like. Suitable azido-functional silanes include the trialkoxysilanes such as 2-(trimethoxylsilyl) ethyl phenyl sulfonyl azide and (triethoxy silyl) hexyl sulfonyl azide.

Other suitable silane cross-linking agents useful in the practice of the present invention include vinyl functional alkoxy silanes such as vinyl trimethoxy silane and vinyl triethoxy silane. These silane cross-linking agents may be represented by the general formula $RR'SiY_2$ wherein R represents a vinyl functional radical attached to silicon through a silicon-carbon bond and composed of carbon, hydrogen, and optionally oxygen or nitrogen, wherein each Y represents a hydrolyzable organic radical, and wherein R' represents a hydrocarbon radical or Y.

Usually, free-radical initiating species, such as the organic peroxides described above, are incorporated along with the vinyl alkoxy silane to perform hydrogen extraction from the polymeric molecular backbone, whereupon the vinyl-functional silane may react and graft thereto. For reference, U.S. Pat. No. 3,646,155 presents further examples of such silanes. Subsequently, the grafted polymeric composition may be exposed to moisture to effect silanolysis condensation reactions therein, thereby cross-linking multiples of pendant silane grafts. Preferably, the composition contains a suitable condensation catalyst. The composition is preferably shaped and formed into the desired profile or shape prior to contact with moisture. Most preferably, the silane cross-linking agent is vinyl trimethoxy silane, which is grafted on to the polymer backbone by the free-radical reaction initiated by 2,2'-bis(t-butylperoxy) diisopropylbenzene. The most preferred silanol condensation catalyst is dibutyl tin dilaurate, which greatly facilitates the cross-linking of pendent silane groups in the presence of moisture, preferably in hot water.

As previously noted, methods of effecting the moisture induced cross-linking by condensation of silane grafts are widely disclosed in the art. Aside from the obvious exposure to hot water, preferably at a temperature above the softening point of the composition, hydrated inorganic compounds such as gypsum or other water-solvable or water-absorbing species may be incorporated into the composition which, upon heating the composition above the hydration-liberation temperature, advantageously release moisture to effect the condensation or silane pendent groups. Alternatively, moisture may be introduced directly into continuous melt-processing equipment, such as an extruder, either alone or in combination with one of the components of the composition. The moisture is preferably introduced at a downstream feeding port, which may optionally be used in combination with a physically expanding foaming agent. For example, U.S. Pat. No. 4,058,583 (Glander) discloses the injection of moist inert gases, such as nitrogen, into a downstream port of a profile extruder, to both effect the expansion of silane-grafted compositions and the condensation of the silanes.

For moisture-cured polyolefin systems wherein long-term moisture stability is essential, U.S. Pat. No. 4,837,272 (Kelley) discloses methods of subsequently reacting the silane-grafted compositions with organo titanates to result in relatively moisture-stable adducts which readily cross-link in the presence of atmospheric moisture, even in absence of silanol condensation catalysts, to form the cross-linked structures.

Suitable methods for cross-linking olefinic compositions with high-energy, ionizing radiation involve the use of equipment which generates electrons, X-rays, Beta-rays or Gamma-rays. "Ionizing radiation" denotes electromagnetic waves or charged particles having the ability to interact directly or indirectly with a substance and consequently ionizing the substance. "High energy" is used to denote the relatively high potential of such radiation, necessary to uniformly and sufficiently penetrate the articles of the composition of this invention.

The most preferred method for cross-linking olefinic compositions through exposure to ionizing radiation is through the use of an electron-beam radiation source. The use of electron-beam radiation cross-linking results in fine cell structure and good surface quality, due in large part to the completion of cross-linking prior to the initiation of the expansion process step. Disadvantages of this method include the high cost of the equipment and the infeasibility of utilizing this method in a continuous manufacture, since a single electron-beam source will only be economically supported by many continuous extrusion lines. Furthermore, certain polymers are susceptible to preferential chain scission or degradation instead of undergoing the desired cross-linking reaction.

Exposure of the compositions of the present invention to ionizing radiation may be accomplished at dosages in the range of about 0.1 to 40 Megarads, and preferably, at about 1 to 20 Megarads. U.S. Pat. No. 4,203,815 (Noda) discloses suitable methods for use with the present invention, including the exposure of compositions to both high and low-energy ionizing radiation so as to effect improvements in surface quality, strength and subsequent heat-sealing or embossing processes. The amount of cross-linking may be appropriately controlled by the dosage of ionizing radiation, with preference dictated by the requirements of the ultimate application of the composition of this invention. Optionally, coagents as described above may be incorporated into radiation-crosslinked compositions with advantageous results toward cure speed and uniformity of cross-linking.

Regardless of the method of cross-linking used, acceptable foamed articles may only be obtained by utilization of cross-linking over certain ranges of cross-linking density or level. Excessive cross-linking prior to foaming will render the foam composition too inelastic, resulting in less than optimal expansion and greater than optimal density for a given level of foaming agent. For processes which invoke cross-linking subsequent to expansion, excessive cross-linking would be economically inefficient. Less than optimal cross-linking may be detrimental to certain physical properties, such as compression set properties or thermal resistance. One parameter for quantifying the degree of cross-linking is the "gel content" of the composition. The term "gel content," as used in this disclosure, is intended to describe the weight percent of an insoluble portion of the cross-linked product (on a dried basis) remaining after about 50 mg of a sample of the cross-linked product has been immersed in 25 ml of molecular-sieve dried xylene for 24 hours at 120° C. Process conditions should be utilized when providing for a cross-linked foam structure such that the resulting gel content is preferably in the range of about 5% to about 95%, more preferably in the range of about 10% to about 40%, and most preferably in the range of about 12% to about 25%.

The expanding medium, or foaming agents, useful in the practice of the present invention may be normally gaseous, liquid or solid compounds or elements, or mixtures thereof. In a general sense, these foaming agents may be characterized as either physically-expanding or chemically decomposing. Of the physically expanding foaming agents, the term "normally gaseous" is intended to mean that the expanding medium employed is a gas at the temperatures and pressures encountered during the preparation of the foamable compound, and that this medium may be introduced either in the gaseous or liquid state as convenience dictates.

Included among the normally gaseous and liquid foaming agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane (CFC-12), trifluorochloromethane, trichloromonofluoromethane (CFC-11), ethyl fluoride, ethyl chloride, 2,2,2-trifluoro-1,1-dichloroethane (HCFC-123), 1,1,1-trichloroethane, difluoro-tetrachloroethane, 1,1-dichloro-1-fluoroethane (HCFC-141b), 1,1-difluoro-1-chloroethane (HCFC-142b), dichloro-tetrafluoroethane (CFC-114), chlorotrifluoroethane, trichlorotrifluoroethane (CFC-113), 1-chloro-1,2,2,2-tetrafluoroethane (HCFC-124), 1,1-difluoroethane (HFC-152a), 1,1,1-trifluoroethane (HFC-143a), 1,1,1,2-tetrafluoroethane (HFC-134a), perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and mixtures thereof. Other normally gaseous and liquid foaming agents that may be employed are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as nitrogen, argon, neon or helium, can be used as foaming agents with satisfactory results.

Solid, chemically decomposable foaming agents, which decompose at elevated temperatures to form gasses, can be used to expand the compositions of the invention. In general, the decomposable foaming agent will have a decomposition temperature (with the resulting liberation of gaseous material) from 130° C. to 350° C. Representative chemical foaming agents include azodicarbonamide, p,p'-oxybis (benzene) sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazides as well as various acid/bicarbonate compounds which decompose when heated.

The preferred volatile liquid foaming agents include isobutane, difluoroethane or blends of the two. For decomposable solid foaming agents, azodicarbonamide is preferred, while for inert gases, carbon dioxide is preferred.

The art of producing cross-linked foam structures is well known, especially for polyolefin compositions. The foam structure of the present invention may take any physical configuration known in the art, such as sheet, plank, other regular or irregular extruded profiles, and regular or irregular molded bun stock. Exemplary of other useful forms of foamed or foamable objects known in the art include expandable or foamable particles, moldable foam particles, or beads, and articles formed by expansion and/or consolidation and fusing of such particles. Such foamable article or particle compositions may be cross-linked prior to expansion, such as for the process of free-radical initiated chemical cross-linking or ionizing radiation, or subsequent to expansion. Cross-linking subsequent to expansion may be effected by exposure to chemical cross-linking agents or radiation or, when silane-grafted polymers are used, exposure to moisture optionally with a suitable silanolysis catalyst.

Illustrative, but non-limiting, of methods of combining the various ingredients of the foamable composition include melt-blending, diffusion-limited imbibition, liquid-mixing, and the like, optionally with prior pulverization or other particle-size reduction of any or all ingredients. Melt-blending may be accomplished in a batchwise or continuous process, and is preferably carried out with temperature control. Furthermore, many suitable devices for melt-blending are known to the art, including those with single and multiple Archimedean-screw conveying barrels, high-shear "Banbury" type mixers, and other internal mixers. The object of such blending or mixing, by means and conditions which are appropriate to the physical processing characteristics of the components, is to provide therein a uniform mixture. One or more components may be introduced in a step-wise fashion, either later during an existing mixing operation, during a subsequent mixing operation or, as would be the case with an extruder, at one or more downstream locations into the barrel.

Expandable or foamable particles will have a foaming agent incorporated therein, such as a decomposable or physically expandable chemical blowing agent, so as to effect the expansion in a mold upon exposure of the composition to the appropriate conditions of heat and, optionally, the sudden release of pressure.

One preferred method of providing a sheet object of this invention involves silane-grafting, subsequent extrusion of a melt-blended profile, moisture-induced cross-linking of the profile, and finally oven-expansion of the profile. In the first step, a portion of the polymeric resins of the foam composition, which contains at least a portion of the essentially linear olefin copolymer of this disclosure, is melt-blended with a 20:1 mixture of vinyl trimethoxy silane (VTMOS) and dicumyl peroxide in an extruder to effect the grafting of VTMOS onto the polymers. This composition is extruded out of a multiple-strand die face, is chilled in water, and is then pelletized. In a subsequent step, the silane-grafted composition, along with ungrafted polymeric resins, chemically decomposable foaming agents, colorants, pigments, dibutyl tin dilaurate silanolysis catalyst, or, optionally, antioxidants and stabilizers, are melt-blended and extruded out of a sheet die and then passed through a three-roll stack to shape the profile to the correct gauge. The unexpanded sheet is then passed through a hot-water tank for sufficient time to effect the cross-linking, and is then passed through a gas-fired, hot-air oven to effect the decomposition of the foaming agent and expansion.

In another preferred method, the extruded profile from the above method, prior to exposure to hot water, is multiple-stacked and consolidated in a press within a suitable mold at a temperature below the decomposition of the foaming agent. Subsequently, it is exposed to hot water for sufficient time so as to effect the cross-linking via the silanolysis reaction. Optionally, at this point the resulting preform is again placed into a high-pressure press within a suitable mold to initiate the foaming agent decomposition. Finally, the partially expanded preform is fully expanded within a hot-air forced-convection oven.

In an alternate procedure, a "Banbury" type mixer is used to fuse a mixture of the grafted composition and other ungrafted resins and components. The fused mixture is then molded into a preform, cross-linked by exposure to hot water, and then expanded as described above.

In yet another preferred method, a silane-grafted composition is melt-blended with a physically-expanding foaming agent such as isobutane, additional ungrafted polymeric resins, dibutyl tin dilaurate silanolysis catalyst, nucleants such as talc, and optionally antioxidants and stabilizers in a single-screw extruder. Optionally, a twin-screw extruder may be utilized. This composition is extruded out of a coat-hanger die whereupon the foaming agent expands and a fully-expanded foam sheet or plank results thereof. The net-shape sheet, plank, or board is the placed in humid storage for sufficient time to effect the cross-linking.

Several additives, as are known to the art, may be added to the compositions of the present invention without departing from the scope of the invention. Specifically contemplated is the addition of materials which are relevant toward cross-linked foam structure compositional development and production, such as particulate and fibrous fillers to reinforce, strengthen or modify the rheological properties of the foam composition. Also contemplated is the addition of antioxidants (e.g., hindered phenolics such as Irganox 1010, phosphites such as Irgafos 168, or polymerized trimethyl-dihydroquinoline such as Agerite AK, Resin D or Flectol H), ultra-violet and thermal stabilizers, pigments or colorants, cell-growth nucleants such as talc and the like, cell-structure stabilizers such as fatty-acids, -esters (e.g. glycerol monostearate) or -amides, property-modifiers, processing aids, additives, catalysts to accelerate cross-linking or other reactions, and blends of two or more of the aforementioned materials.

Table IA is a non-limiting tabulation of certain parametric characteristics of some essentially linear polyolefin copolymers which are suitable for use with the present invention. The materials in Table IA are commercially available and are produced by the Exxon Chemical Company at its facility in Baytown, Tex.:

The use of specific secant modulus is a method intended to eliminate uncertainties in the compression/deflection results at the 25% strain level. Since compression/deflection is a measure of the stress at 25% or 50% strain, the differential of compression/deflection divided by the differential in strain (0.25) results in the secant modulus. As with specific tensile strength, the secant modulus has been normalized for (divided by) the foam density in order to obtain specific secant modulus.

Silane-Grafted Resins

In the following examples, samples were separately grafted at a rate of approximately 30 lb/hr using a 60 mm diameter, 24:1 L/D single-screw extruder maintained at approximately 200° C. A mixture of vinyl trimethoxy silane (Huls #CV-4917) and alpha, alpha'-bis (t-butylperoxy) diisopropyl benzene (VULCUP-R) in a ratio of 20:1 was metered directly into the feed throat of the extuder. The rate of silane/peroxide introduction was maintained at 0.4% of resin feedrate. The grafted composition was passed out of a multi-strand die head through a water-cooling trough, and chopped into pellets with a granulator. Graft designation L-68 was thereby produced from a metallocene-catalyed polyolefin (EXACT 4041, 3.0 Melt Index, 0.878 g/cc. specific gravity, Exxon Chemical Co.) and used as a blending component for physically expanded polyolefin foams. Graft designation L-416 was similarly prepared from EXACT 4049 (4.5 Melt Index, 0.873 g/cc specific gravity, Exxon Chemical Co.).

Resins

Inclusive of resins utilized to produce physically blown foams were:

TABLE IA

| Product Designation | Melt Index (dg/min) | Density (g/cc) | Comonomer Type | Content | CDBI (%) | Mw/Mn |
|---|---|---|---|---|---|---|
| Exact ™ 4041 | 3.0 | 0.878 | 1-butene | 23.5% | NA | 20 ± 02 |
| Exact ™ 5008 | 10 | 0.865 | 1-butene | 31.6% | NA | 20 + 02 |
| Exact ™ 4028 | 10 | 0.880 | 1-butene | 23.1% | NA | 20 + 02 |
| Exact ™ 4017 | 4.0 | 0.885 | 1-butene | 20.2% | NA | 20 + 02 |
| Exact ™ 3024 | 4.5 | 0.905 | 1-butene | 11.2% | 83.7% | 20 + 02 |
| Exact ™ 3025 | 1.2 | 0.910 | 1-butene | 9.6% | >83% | 20 + 02 |
| Exact ™ 3012 | 4.5 | 0.910 | 1-hexene | 10.4% | 88.2% | 20 + 02 |
| Exact ™ 3011 | 3.5 | 0.910 | 1-hexene | 11.1% | 92.0% | 20 + 02 |
| Exact ™ 3030 | 2.25 | 0.905 | 1-hexene | 12.9% | 92.2% | 20 + 02 |
| Exact ™ 3031 | 3.5 | 0.900 | 1-hexene | 15.4% | >88% | 20 + 02 |

Notes: NA = Not Applicable, polymer is too soluble to determine by TREF

The physical properties of the resins disclosed herein are measured by the appropriate ASTM test methods. Further characterization and comparisons were drawn by use of the following definitions:

Specific Tensile Strength = Tensile Strength, (psi) (psi/pcf) Density, (pcf)     (1)

Specific Secant Modulus = ((Compression/Deflection @ 50% strain) − (Compression/Deflection @ 25% strain))/ ((0.25) * (Density, (pcf))     (2)

TABLE IB

| Component | Manufacturer | Melt Index | Specific Gravity | Comments |
|---|---|---|---|---|
| EXACT 5008 | Exxon Chemical Company | 8.61 | 0.865 | butene-based, metallocene-catalyzed VLD polyolefin |
| EXACT 4049 | Exxon Chemical Company | 4.35 | 0.873 | butene-based, metallocene-catalyzed VLD polyolefin |
| EXACT 4041 | Exxon Chemical Company | 2.88 | 0.878 | butene-based, metallocene-catalyzed VLD polyolefin |
| DFDB-1085NT | Union Carbide Corporation | 1.0 | 0.885 | FLEXOMER, octene-based VLD polyolefin, UNIPOL II process |
| EG-8200 | Dow Chemical Co. | 5.0 | 0.870 | ENGAGE, octene-based metallocene-catalyzed VLD polyolefin |
| Graft L-65 | Sentinel Products Corporation | 1.70 | — | from EXACT 4041, VTMOS-grafted |
| Graft L-416 | Sentinel Products Corporation | 3.39 | | from EXACT 4049, VTMOS-grafted |
| Profax PF-814 | Himont, Inc. | 3.0 | 0.900 | propylene homopolymer, high melt-strength |
| Profax SD-632 | Himont, Inc. | 2–4 | 0.900 | ethylene/propylene copolymer, high melt-strength |

In the following examples, the indicated pellicular compositions were fed into a 2.5" diameter, 40:1 L/D single-screw extruder fitted with an injection port and high-pressure diaghram pump at mid-barrel for the introduction of volatile expansion agents. Isobutane was thus introduced into the melted blend and the composition further blended and cooled prior to being forced through a cross-head sheet die. The tooling for the die consisted of a 1.07" diameter pin and bushing. The foam thus produced was stretched and formed over a 3.975" diameter, water-chilled mandrel. Further cooling was thereby provided by means of an annular air ring, thus cooling the exterior of the foamed annular profile. The profile was slit lengthwise, opened out and then rolled up. Process conditions for each of the examples are exhibited in Table IB.

EXAMPLE I

The following materials were tumbled in a 45 gallon drum and fed into the aforementioned foam extruder:

50 lb. Himont Profax PF-814;

0.5 lb. glycerol monostearate (Witco/Humko Div. ATMOS-150);

2.5 grams citrate/bicarbonate nucleant (Reedy International SAFOAM FP); and 21 grams naphthenic process oil (Stanlube-60), used to adhere the powders to the pellets.

The high melt strength propylene homopolymer was foamed to an apparent density of 2.72 pcf and a thickness of 0.173 in. As demonstrated in the attached Table IB, a motor current of 18–20 amps was observed at a screw speed of 34 rpm. The specific tensile strength (tensile strength divided by density) was 60.7 psi/pcf while the specific secant modulus (as defined above) between 25% and 50% compression was 19.5 psi/pcf. These responses may be taken as representative of a high melt strength polypropylene foam.

EXAMPLE II

The following materials were tumbled in a 45 gallon drum and fed into the aforementioned foam extruder:

50 lb. Himont Profax SD-632;

0.5 lb. glycerol monostearate (Witco/Humko Div. ATMOS-150);

2.5 grams citrate/bicarbonate nucleant (Reedy International SAFOAM FP); and 21 grams naphthenic process oil (Stanlube-60, used to adhere the powders to the pellets.

The high melt strength ethylene/propylene copolymer was foamed to an apparent density of 3.2 pcf and a gauge of 0.100 in. As demonstrated in the attached Table IB, the motor current was 22–24 amps at a screw speed of 34 rpm. The specific tensile strength was 54.7 psi/pcf, while the specific secant modulus was 8.03 psi/pcf. This may be considered a representative foam of a high melt strength copolymer polypropylene resin, which is considerably softer than the homopolymer polypropylene. Thus, softer foams may be obtained by the use of copolymer polypropylene resins, but at a penalty of less density reduction, thinner gauge, lower specific tensile strength and higher motor draw.

EXAMPLE III, IV, V

Herein, blends of various linear low density polyolefins with the homopolymer polypropylene were prepared to distinguish ease of processing and physical properties.

| EXAMPLE III | EXAMPLE IV | EXAMPLE V | |
|---|---|---|---|
| 40 lb. | 40 lb. | 40 lb. | Himont Profax SD-632 |
| 10 lb. | | | Union Carbide DFDB-1085NT |
| | 10 lb. | | Dow Chemical Co. EG-8200 |
| | | 10 lb. | Exxon EXACT-5008 |
| 0.5 lb. | 0.5 lb. | 0.5 lb. | Witco/Humko Div. ATMOS-150 |
| 1.0 g. | 1.0 g. | 1.0 g. | SAFOAM FP |
| 21 g. | 21 g. | 21 g. | Stanlube-60 |

In reference to Table IB, each candidate linear polyolefin exhibited a substantially reduced specific secant modulus compared with the homopolymer polypropylene resin, due largely to the substantially reduced bulk moduli of the additional resin. However, in all cases the motor draw was higher than the homopolymer and, in the case of the metallocene-catalyzed LLDPE EXACT-5008, which is absent of long-chain branching, higher than even the copolymer polypropylene resin. Furthermore, the specific tensile strengths were considerably lower for the VLDPE Flexomer DFDB-1085NT and the metallocene-catalyzed Engage EG-8200 blends, suggestive of borderline blend incompatibility. Visually, the extrudate of Example III and Example IV variants appeared streaky, almost milky. The latter EG-8200 metallocene-catalyzed linear low density polyolefin contains a low level of long chain branches, purported by the manufacturer to enhance processability, and of these three variants, exhibited the lowest motor current. In all cases, the ultimate tensile elongations were higher than either of the homopolymer or copolymer polypropylenes, indicative of significantly greater toughness.

EXAMPLE VI, VII

A comparison of a 20/80 blend of a metallocene-catalyzed linear low density polyolefin, absent of long-chain branching, in homopolymer polypropylene, to that of a similar blend using the vinyl trimethoxy silane graft of this same metallocene-catalyzed polyolefin, was accomplished using the following formulation:

| EXAMPLE VI | EXAMPLE IV | |
|---|---|---|
| 40 lb. | 40 lb. | Himont Profax SD-632 |
| 10 lb. | | Exxon EXACT-4049 |
| | 10 lb. | Graft L-416 (from EXACT-4049) |
| 0.5 lb. | 0.5 lb. | Witco/Humko Div. ATMOS-150 |
| 1.25 g. | 1.0 g. | SAFOAM FP |
| 21 g. | 21 g. | Stanlube-60 |
| | 3.4 g. | dibutyl tin dilaurate |

In reference to Table IB, significantly higher motor draw accompanied the incorporation of 20% of the metallocene-catalyzed polyolefin EXACT-4049, but resulted in a softer product than the homopolymer polypropylene. Thermal stability, as evidenced by shrinkage of the foamed material after 7 days at 215° F., was essentially equivalent. Remarkably, utilization of the same blend ratio of a vinyl trimethoxy silane-grafted EXACT-4049 provided for lower motor draw and greater density reduction than the ungrafted EXACT resin, despite the fact that the grafted resin possesses a lower Melt Index than the virgin resin (3.39 versus 4.39). Also, as would be expected, the foam of the silane-grafted variant exhibited less shrinkage after 7 days at 215° F., a consequence of the cross-linking of silane moeities. Furthermore, toughness of this grafted variant, as evidenced by the ultimate tensile elongation, was superior to either the homopolymer or copolymer polypropylene. By adjustments in the rate of silane incorporation, a balance between toughness, softness and tensile strength would be attained.

EXAMPLE VIII

An additional 20/80 blend was evaluated, herein with an alternate silane-grafted metallocene-catalyzed polyolefin resin, using the following formulation:

40 lb. Himont Profax SD-632

10 lb. L-68 (grafted Exxon EXACT-4041)

0.5 lb. Witco/Humko Div. ATMOS-150

1 g. SAFOAM FP 21 g. Stanlube-60

In reference to Table IB, the motor draw for this variant was less than Example VII (the EXACT-4049 grafted resin) despite the fact that the melt index of the L-68 was considerably lower than L-416 (1.7 versus 3.6). Also, the specific secant modulus was lower, and the specific tensile strength and ultimate elongation were greater, than the Example VII grafted variant. In relation to the homopolymer polypropylene of Example I, the tensile elongation was dramatically higher and the specific secant modulus and shrinkage at 215° F. considerably lower, but maximum thickness was compromised somewhat. Here as with Example VII, by the appropriate selection of silane grafting levels, a balance of properties should be possible.

What is claimed is:

1. A foamable, crosslinkable extruded profile comprising a composition including a blend of non-silane-grafted polypropylene with silane-grafted, essentially linear polyolefin, wherein the polyolefin has a resin density in the range of about 0.86 g/cm$^3$ to about 0.96 g/cm$^3$, a melt index in the range of about 0.5 dg/min to about 100 dg/min, a molecular weight distribution in the range of from about 1.5 to about 3.5, and a composition distribution breadth index greater than about 45 percent.

2. The extruded profile of claim 1, wherein said polyolefin is a metallocene catalyzed polyolefin.

3. The extruded profile of claim 1, wherein said polypropylene is homopolymer polypropylene.

4. The extruded profile of claim 1, wherein said polypropylene is copolymer polypropylene.

5. The extruded profile of claim 1, wherein said polypropylene is blended with said polyolefin at a ratio by weight of between 99/1 and 50/50.

6. The extruded profile of claim 1, wherein said polypropylene is blended with said polyolefin at a ratio by weight of between 95/5 and 60/40.

7. The extruded profile of claim 1, wherein said polypropylene is blended with said polyolefin at a ratio by weight of between 95/5 and 80/20.

8. The extruded profile of claim 1, wherein said silane grafting agent is a multi-functional vinyl silane.

9. The extruded profile of claim 8, wherein said silane grafting agent is selected from the group consisting of vinyl trimethoxy silane and vinyl triethoxy silane.

10. The extruded profile of claim 1, wherein said composition is physically expanded with a blowing agent.

11. The extruded profile of claim 1, wherein said composition has a density within the range of about 1.2 to about 10 pcf.

12. The extruded profile of claim 1, wherein said composition has a tensile strength within the range of about 110 to about 170 psi.

13. The composition of claim 1, wherein said composition has a tensile elongation within the range of about 50% to about 80%.

14. The extruded profile of claim 1, wherein said composition has a 25% compression deflection within the range of about 6 to about 8 psi.

15. The extruded profile of claim 1, wherein said composition has a 50% compression deflection within the range of about 18 to about 20 psi.

16. The extruded profile of claim 1, wherein said composition has a specific secant modulus within the range of about 14 to about 19 psi/pcf.

17. The extruded profile of claim 1 expanded into a foam, wherein said foam suffers essentially no lineal shrinkage across its thickness when held at 215° F. over a 7 day period.

18. The extruded profile of claim 1, wherein said profile has a density within the range of about 3.0 to about 3.3 pcf and a specific secant modulus within the range of about 14 to about 15 psi/pcf, and wherein said composition has a density within the range of about 2.5 to about 2.7 pcf and a specific secant modulus within the range of about 17 to about 19 psi/pcf.

19. A foamable, crosslinkable extruded profile comprising a composition including a blend of substantially ungrafted homopolymer or copolymer polypropylene with a silane-grafted, metallocene catalyzed polyolefin, wherein said polypropylene is not silane cross-linked and is blended with said polyolefin at a ratio by weight of between 99/1 and 50/50, and wherein said polyolefin is silane grafted with a multi-functional vinyl silane selected from the group consisting of vinyl trimethoxy silane and vinyl triethoxy silane.

20. The extruded profile of claim 19, wherein said polypropylene is blended with said polyolefin at a ratio by weight of between 95/5 and 60/40.

21. The extruded profile of claim 19, wherein said polypropylene is blended with said polyolefin at a ratio by weight of between 95/5 and 80/20.

22. The extruded profile of claim 19, wherein said composition has a density within the range of about 2.5 to about 3.2 pcf, a tensile strength within the range of about 110 to about 170 psi, and a specific secant modulus within the range of about 14 to about 19 psi/pcf.

23. The extruded profile of claim 19, wherein said composition has a tensile elongation within the range of about 50% to about 80%, a 25% compression deflection within the range of about 6 to about 8 psi, and a 50% compression deflection within the range of about 18 to about 20 psi.

24. The extruded profile of claim 19 expanded into a foam, wherein said foam suffers essentially no lineal shrinkage when held at 215° F. over a 7 day period.

25. A crosslinked foam extruded profile comprising a composition including:

a blend of substantially ungrafted homopolymer or copolymer polypropylene with silane-grafted, metallocene catalyzed polyolefin, wherein said polypropylene is not silane cross-linked and is blended with said polyolefin at a ratio by weight of between 95/5 and 80/20, wherein said polyolefin is silane-grafted with a multi-functional vinyl silane selected from the group consisting of vinyl trimethoxy silane and vinyl triethoxy silane, and wherein said polyolefin has a resin density in the range of about 0.86 g/cm$^3$ to about 0.96 g/cm$^3$, a melt index in the range of about 0.5 dg/min to about 100 dg/min, a molecular weight distribution in the range of from about 1.5 to about 3.5, and a composition distribution breadth index greater than about 45 percent.

* * * * *